April 5, 1932.　　　A. R. ALWOOD　　　1,852,911
AUTOMATIC POWER TAKE-OFF
Filed May 3, 1930　　　4 Sheets-Sheet 1
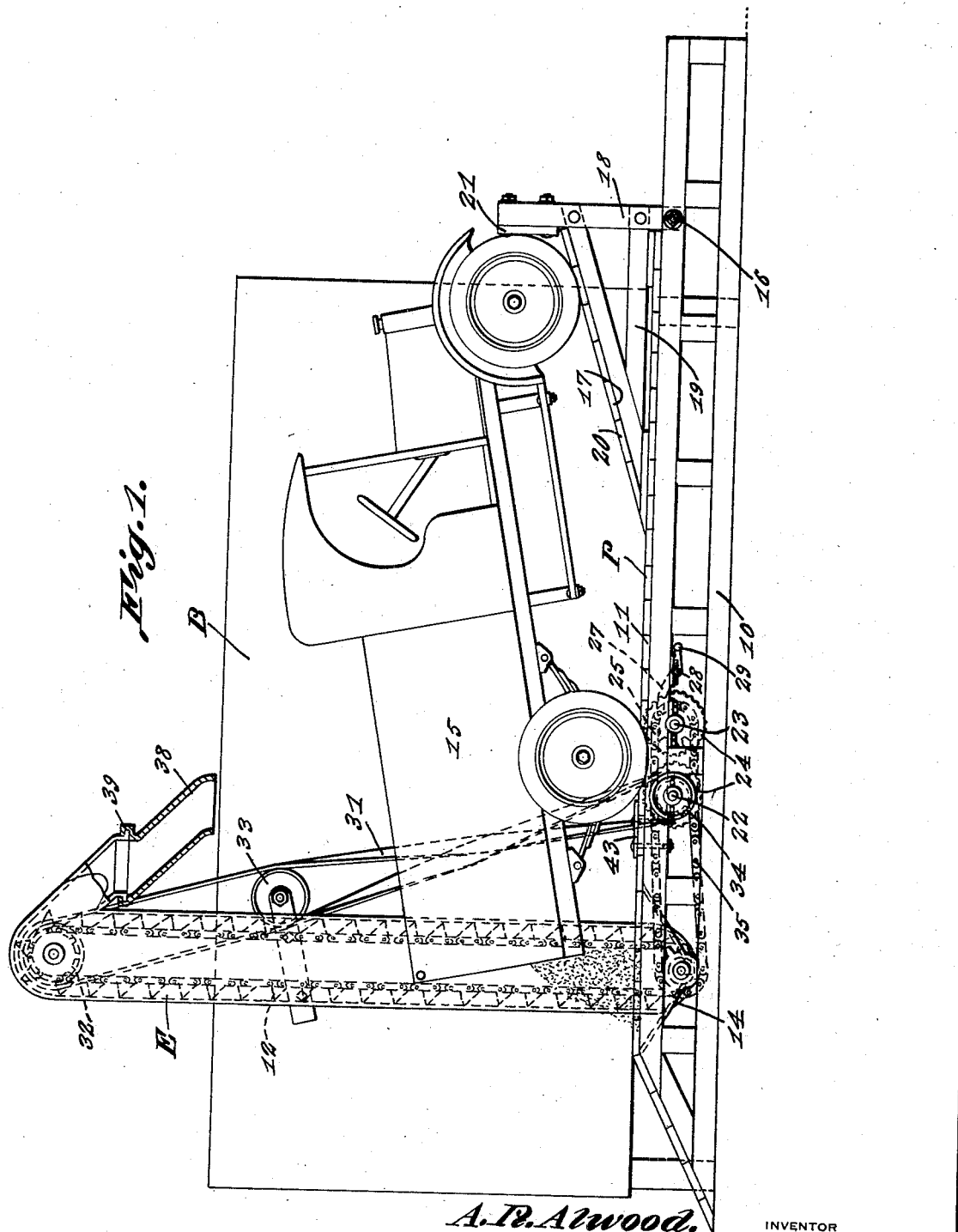

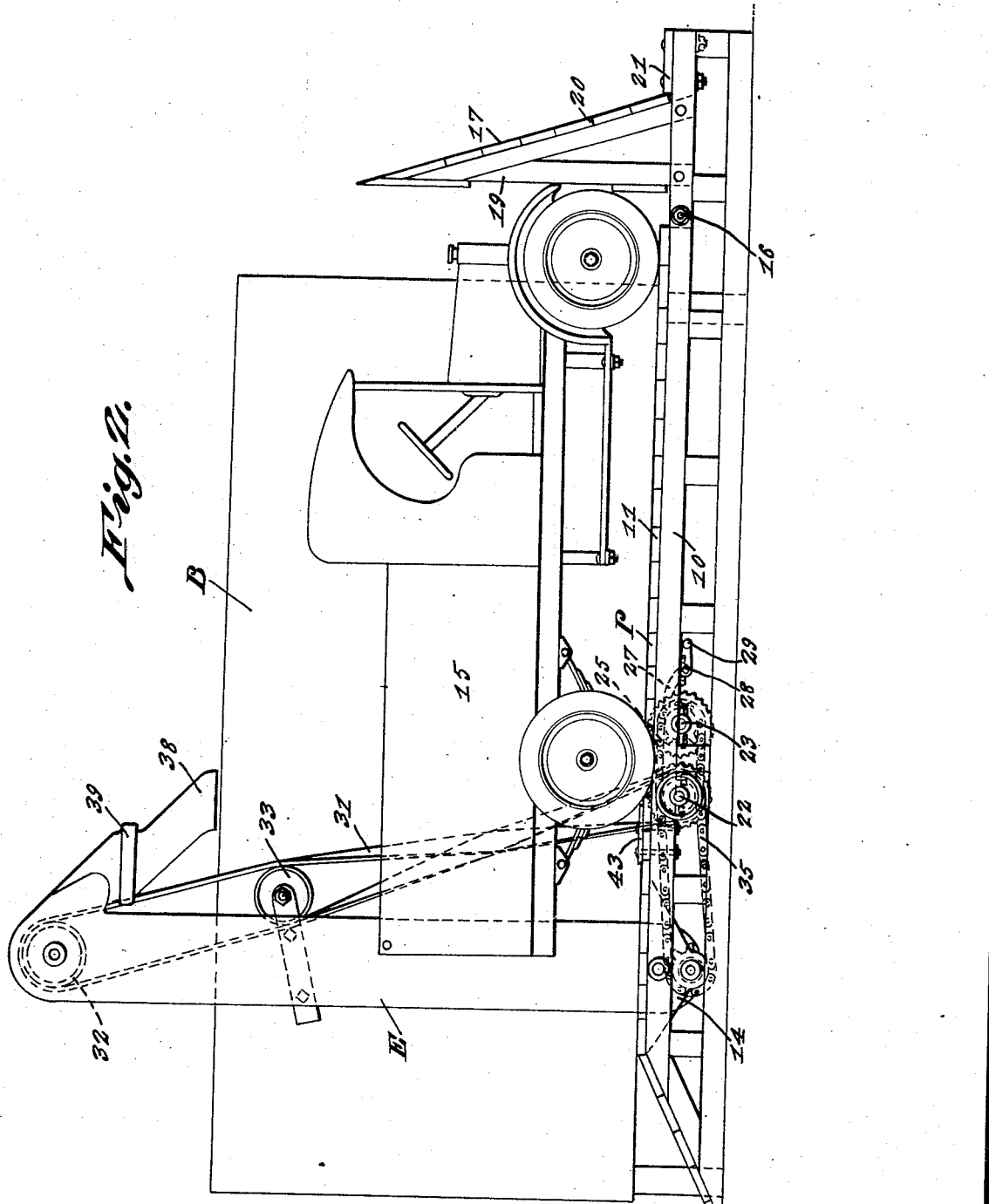

April 5, 1932.  A. R. ALWOOD  1,852,911
AUTOMATIC POWER TAKE-OFF
Filed May 3, 1930    4 Sheets-Sheet 3
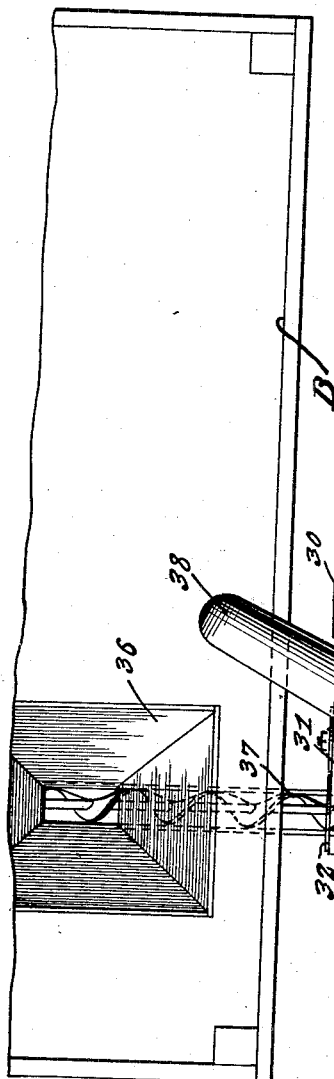
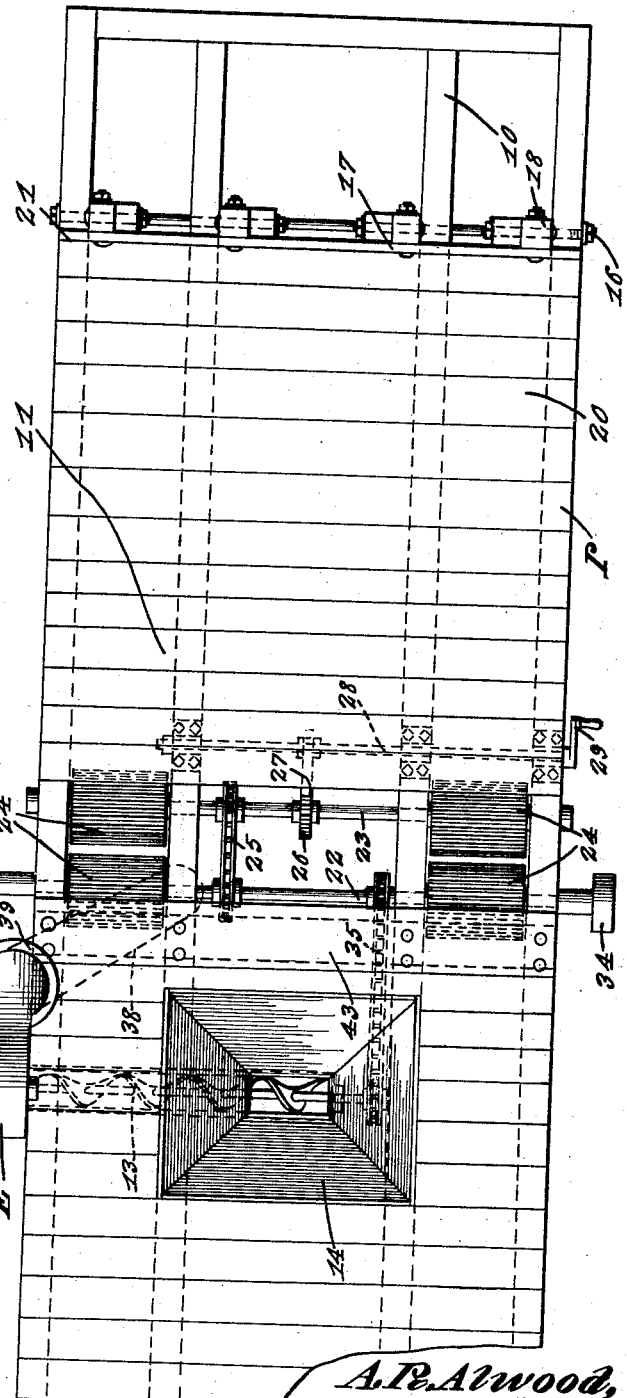

April 5, 1932.  A. R. ALWOOD  1,852,911
AUTOMATIC POWER TAKE-OFF
Filed May 3, 1930   4 Sheets-Sheet 4
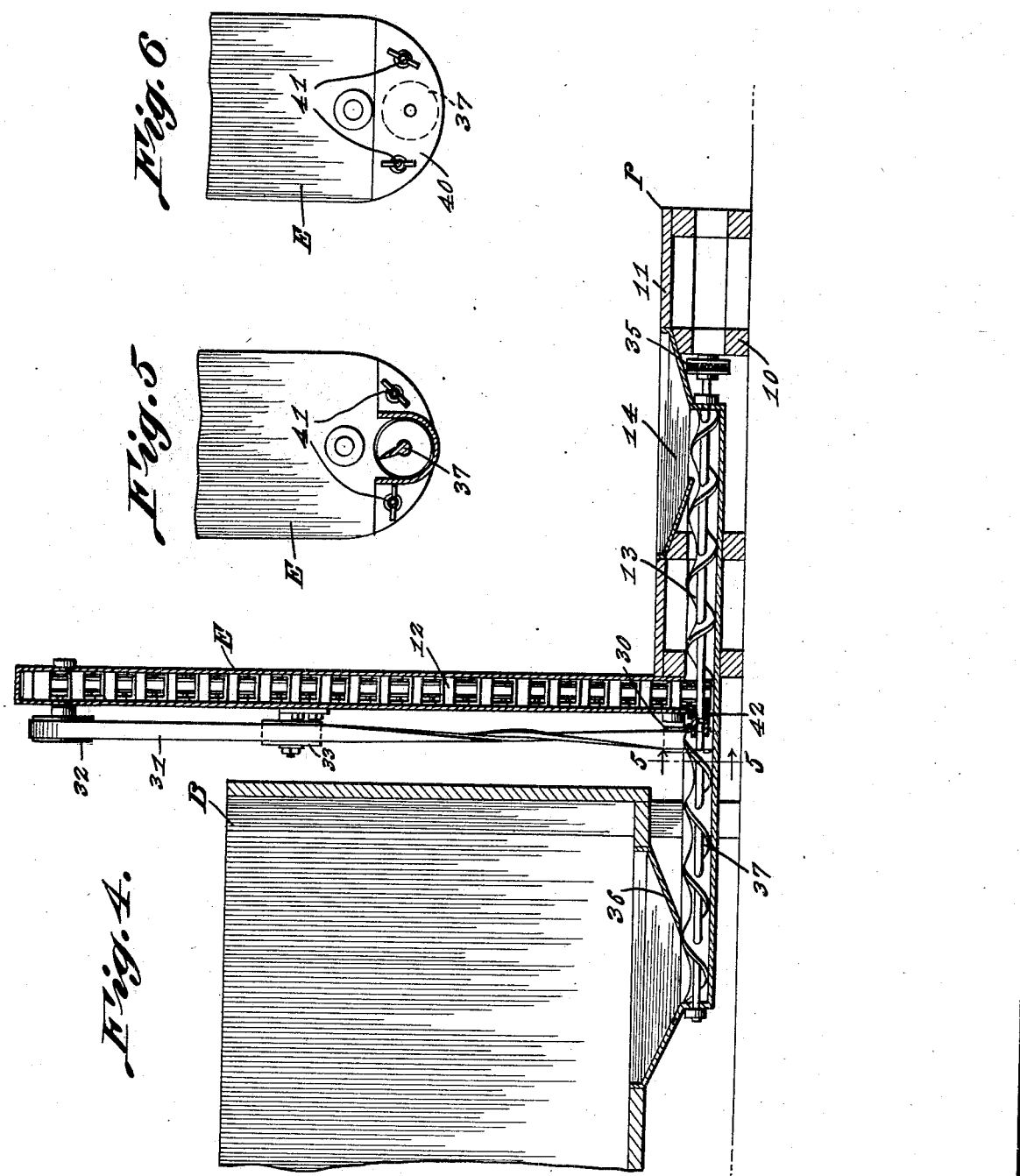

Patented Apr. 5, 1932

1,852,911

UNITED STATES PATENT OFFICE

ARCHIE RUFUS ALWOOD, OF WINFIELD, ALBERTA, CANADA, ASSIGNOR OF ONE-HALF TO WILLIAM PURCELL, OF CADOGAN, ALBERTA, CANADA

AUTOMATIC POWER TAKE-OFF

Application filed May 3, 1930. Serial No. 449,550.

This invention relates to power mechanisms especially adapted for handling grain from threshing machines or combines, an object being to provide means for taking off power from a motor driven vehicle to unload grain or other material into a bin, or to load the material into a vehicle from the bin.

Another object of the invention is the provision of a power take-off mechanism which may be used for driving machines or mechanisms of various types, such as grain cleaners, saw or chopping mills, concrete mixers, as well as for loading grain, gravel or other materials of a like character.

With the above and other objects in view, the invention further includes the following novel features and details of construction, to be hereinafter more fully described, illustrated in the accompanying drawings and pointed out in the appended claims.

In the drawings:—

Figure 1 is a side elevation of the invention showing a motor truck in unloading position.

Figure 2 is a like view showing the truck in position to receive material from the bin.

Figure 3 is a top plan view partly broken away with the parts in position shown in Figure 1, the truck being omitted.

Figure 4 is a transverse sectional view.

Figure 5 is a section on the line 5—5 of Figure 4.

Figure 6 is a fragmentary elevation of the lower end of the elevator housing with the closure plate in place.

Referring to the drawings in detail wherein like characters of reference denote corresponding parts, the invention as shown consists of a wooden platform P, a bin B and an elevator E, together with operating mechanism to be described. While a wooden platform is illustrated, it is obvious that other materials may be used in the construction of the platform and bin.

The platform shown comprises a frame 10 which supports a floor 11, while the bin B is arranged at one side of this platform.

The elevator E is positioned between the platform and bin and may be of the bucket type as indicated at 12. These buckets receive material from a horizontal conveyor 13 which has one of its ends arranged to convey material from the hopper 14 to the elevator 12. This hopper is mounted in the floor 11 of the platform and is designed to receive material from the box 15 of a motor operated truck.

Material from the box 15 of the truck is dumped into the hopper 14 and to facilitate this dumping operation, the front end of the platform has pivotally secured thereto as shown at 16, a combined abutment and elevating member 17. This member comprises a base 18 from which extends a right angularly disposed frame 19 and an inclined frame 20. This last mentioned frame forms an inclined elevating member upon which the front wheels of the truck are adapted to be run so as to elevate this end of the truck and incline the rear end of the box 15 downward.

The material from the box will then run by gravity into the hopper 14. An abutment 21 is arranged at one end of the inclined portion 20 for engagement by the front wheels of the truck. The right angular frame 19 provides an abutment for the front wheels of the truck when the truck is in a horizontal position as is shown in Figure 2 of the drawings.

Mounted upon shafts 22 and 23 beneath the floor 11 are spaced pairs of driving rollers 24. The shafts 22 and 23 are connected by a chain and sprocket connection 25, while the shaft 23 carries a ratchet wheel 26. This wheel is adapted to be engaged by a spring influenced dog 27 so as to prevent retrograde rotation. The dog 27 is carried by shaft 28 and the outer end of this shaft is provided with a crank handle 29, whereby the shaft 23 may be released if desired.

The shaft 22 has mounted thereon a pulley 30 and this pulley furnishes power for the operation of the buckets of the elevator E through the medium of a belt 31 and a pulley 32. This belt also engages a guide pulley 33. The shaft 22 also has mounted thereon a pulley 34, by means of which power may be taken for the operation of other mechanisms.

A chain and sprocket drive 35 is provided between the shaft 22 and the conveyor 13.

The bin B is provided in its bottom with a hopper 36, while a horizontal conveyor 37 extends from this hopper to the conveyor E, so that material from the bin may be transferred to the conveyor and from this conveyor into the box 15 of the truck, in a manner to be described.

Extending from the upper end of the housing of the elevator E is a discharge spout 38. This spout has a swivel connection 39 with the housing so that its discharge end may be positioned over the bin B as shown in Figure 3 of the drawings, or it may be swung to the dotted line position in said figure.

In unloading grain from the truck box 15, the drive wheels of the truck are positioned upon the rollers 24 with the front wheels of the truck elevated as shown in Figure 1. Operation of the drive wheels will operate the rollers and drive the conveyor 13, so that material falling from the truck will pass through the hopper 14 into the conveyor 13 and be carried to the lower end of the elevator. During the unloading operation, the lower end of the elevator housing upon the side adjacent the bin is closed by a plate 40. This plate is removably held in place by means of fastening devices 41, so that the material cannot pass horizontally through the elevator housing. The material will be carried upward by the conveyor buckets and directed by the discharge spout 38 into the bin. When it is desired to transfer material from the bin into the truck box 15, the plate 40 is removed and the shaft of the conveyor 37 is connected with the shaft of the conveyor 13 by means of a coupling 42. The truck is arranged as shown in Figure 2 of the drawings so that its drive wheels will operate the rollers 24 and drive the conveyor 37 and elevator E. The discharge spout 38 will be arranged as shown in the dotted line position in Figure 3 of the drawings.

The platform is provided with a transversely arranged plate 43 which extends over one of the rollers 24 of each pair and facilitates backing the truck from the rollers. The dog 27 will hold the rollers against retrograde rotation while the truck is being removed.

The invention is susceptible of various changes in its form, proportions and minor details of construction and the right is herein reserved to make such changes as properly fall within the scope of the appended claims.

Having described the invention what is claimed is:—

1. In a power take-off mechanism, a vehicle supporting platform, a bin at one side thereof, a hopper beneath the platform to receive material from the vehicle upon said platform, an elevator between the hopper and bin, a conveyor extending from the hopper to the elevator, a hopper in the bottom of the bin, a conveyor extending from the bin hopper to the elevator, a discharge spout extending from the conveyor to direct material either into the hopper or into a vehicle upon the platform, and means operated by a vehicle upon the platform to drive the conveyor and elevator.

2. In a power take-off mechanism, a vehicle supporting platform, spaced shafts mounted beneath the platform, a bin at one side of the platform, a hopper beneath the platform to receive material from the vehicle upon said platform, an elevator between the hopper and bin, a conveyor extending from the hopper to the elevator, a hopper in the bottom of the bin, a conveyor extending from the bin hopper to the elevator, a discharge spout extending from the conveyor to direct material either into the hopper or into a vehicle upon the platform, and spaced means mounted on said shafts and operated by a vehicle on the platform to drive the conveyor and elevator.

3. In a power take-off mechanism, a vehicle supporting platform, spaced shafts mounted beneath the platform, a chain-driven connection between said shafts, a bin at one side of the platform, a hopper beneath the platform to receive material from the vehicle upon said platform, an elevator between the hopper and bin, a drive connection between one of said shafts and said elevator, a conveyor extending from the hopper to the elevator, a hopper in the bottom of the bin, a conveyor extending from the bin hopper to the elevator, a discharge spout extending from the conveyor to direct material either into the hopper or into a vehicle upon the platform, and spaced rollers mounted on said shafts and operated by a vehicle on the platform to drive the conveyor and elevator.

In testimony whereof I affix my signature.

ARCHIE R. ALWOOD.